United States Patent

[11] 3,582,782

[72] Inventor Daniel Danielsen
Wheaton, Ill.
[21] Appl. No. 723,667
[22] Filed Apr. 24, 1968
[45] Patented June 1, 1971
[73] Assignee Bell Telephone Laboratories, Incorporated
Murray Hill, Berkeley Heights, N.J.

[54] HARMONIC SINE WAVE DATA TRANSMISSION SYSTEM
16 Claims, 10 Drawing Figs.

[52] U.S. Cl. ........................................................ 325/7, 325/30, 325/163, 325/320, 178/66
[51] Int. Cl. ........................................................ H04l 27/10, H04b 7/16
[50] Field of Search ............................................ 178/66 A, 66, 67; 325/30, 163, 320, 7, 18

[56] References Cited

UNITED STATES PATENTS

| | | | |
|---|---|---|---|
| 2,676,203 | 3/1954 | Phelps | 178/66 |
| 3,023,269 | 2/1962 | Maniere et al. | 178/67 |
| 3,102,238 | 8/1963 | Bosen | 178/66(A) |
| 3,190,958 | 6/1965 | Bullwinkel et al. | 178/66 |
| 3,205,441 | 9/1965 | Likel | 325/163 |

*Primary Examiner*—Robert L. Griffin
*Assistant Examiner*—James A. Brodsky
*Attorneys*—R. J. Guenther and James Warren Falk

ABSTRACT: A data loop exchanges digital information in the form of sequential combinations of fundamental and third harmonic sine wave signals. The transmitted signal is formed by selectively gating the output signals from phase and frequency synchronized fundamental and third harmonic oscillators in signal periods between zero crossings of the fundamental signal. The received signals are amplitude detected at the midpoint of each signal period. The oscillators associated with one transmission circuit of the loop are synchronized to the oscillators of the other transmission circuit so that digital information may be simultaneously exchanged between the terminal devices of the loop.

INVENTOR
BY D. DANIELSEN

J S Cerbert

ATTORNEY

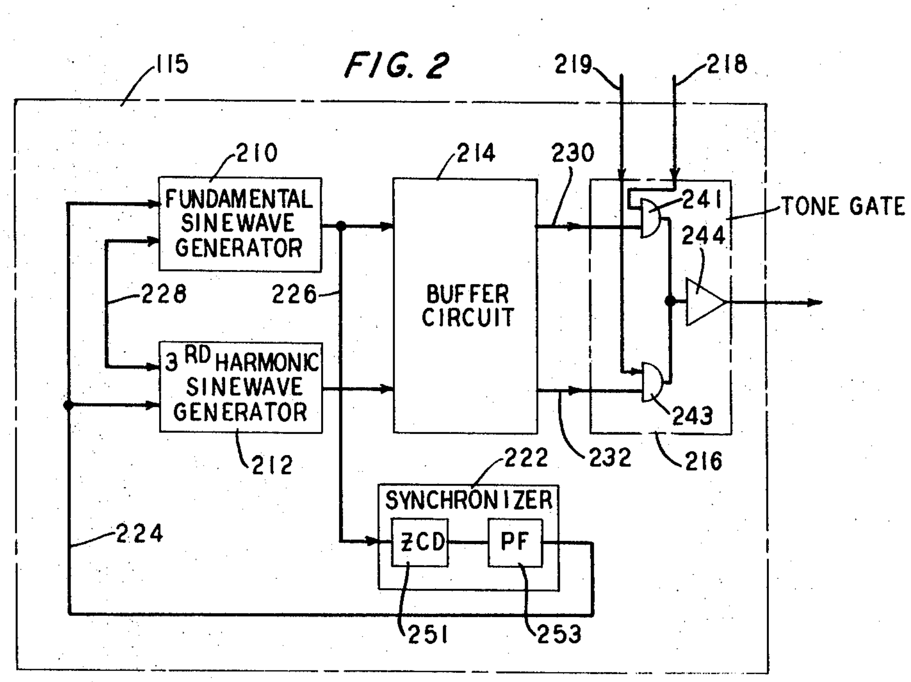
FIG. 2
115
219
218
210
FUNDAMENTAL SINEWAVE GENERATOR
214
230
241
TONE GATE
244
228
226
BUFFER CIRCUIT
3RD HARMONIC SINEWAVE GENERATOR
243
212
222
232
216
SYNCHRONIZER
ZCD
PF
224
251
253
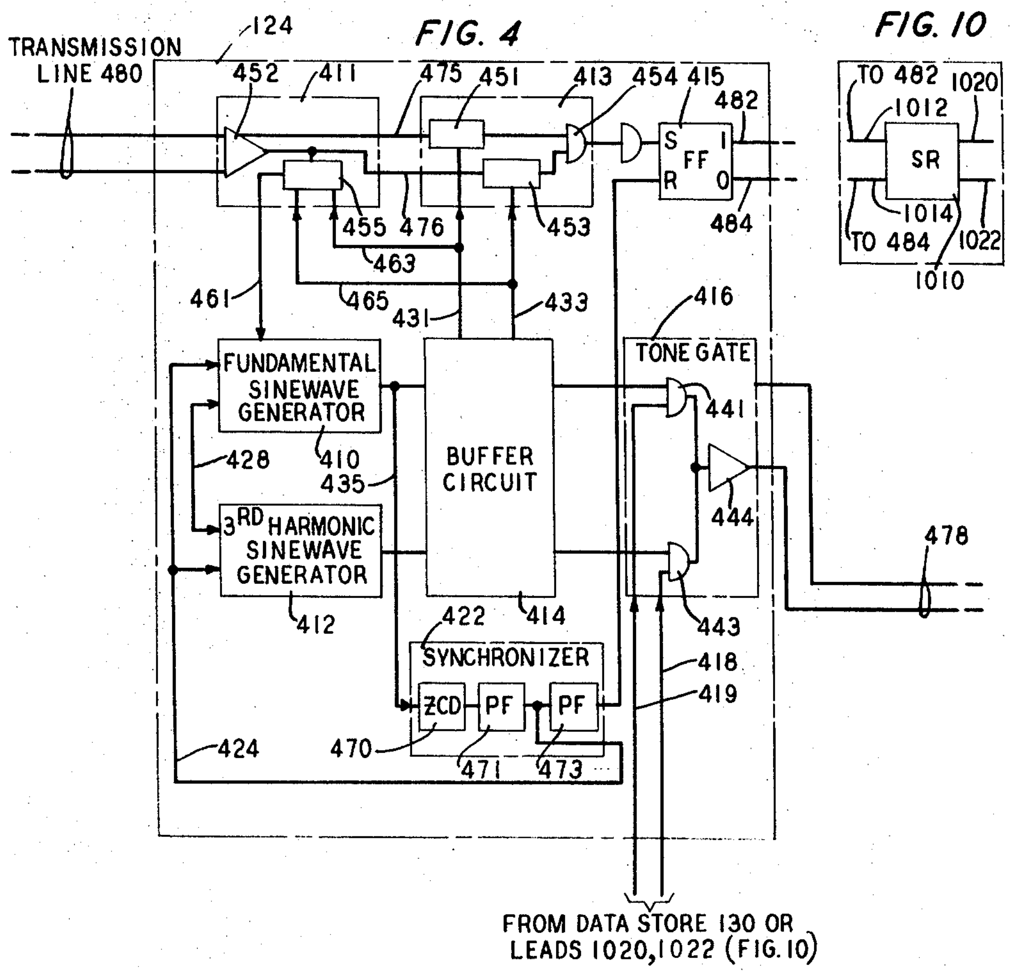
FIG. 4
FIG. 10
TRANSMISSION LINE 480
124
452
411
475
451
413
454
415
482
S
FF
R
1
0
484
455
476
453
463
465
431
433
461
416
TONE GATE
FUNDAMENTAL SINEWAVE GENERATOR
BUFFER CIRCUIT
441
428
410
435
444
3RD HARMONIC SINEWAVE GENERATOR
478
412
422
414
443
SYNCHRONIZER
418
ZCD
PF
PF
419
424
470
471
473
FROM DATA STORE 130 OR LEADS 1020,1022 (FIG.10)
TO 482
1020
1012
SR
1014
TO 484
1022
1010

HARMONIC SINE WAVE DATA TRANSMISSION SYSTEM

BACKGROUND OF THE INVENTION

My invention relates to transmission systems and, more particularly, to frequency shift arrangements for the transmission of digital information.

High-speed transmission of information in digital form requires transmission facilities adapted to accommodate the wide bandwidth of the rapidly changing sequential pulse trains which represent the data to be transmitted. It is often desirable to utilize already existing voice frequency transmission paths to transmit such wideband digital information. Since voice frequency transmission arrangements only provide a relatively narrow bandwidth, high-speed data signals must be modified prior to transmission to avoid signal distortion. The modified signals may be combinations of different frequency sine waves, each sine wave representing one state of digital information to be transmitted. Thus, one kind of signal from a digital source may be represented by a first frequency sine wave and another kind of signal by a second frequency sine wave. The use of the two sine wave signals that are within the range of the voiceband frequencies makes it possible for voice frequency transmission paths, available in present day telephone connections, to transmit digital information over long distances.

In some priorly known phase shift and frequency shift digital transmission systems, pairs of sine wave oscillators provide the signals for narrowband transmission. A switching arrangement connected between the oscillators and the transmission path selectively gates the oscillator signals so that sequential combinations of the sine wave signals are applied to a relatively narrow bandwidth line. This is done under control of the data to be transmitted. Because a plurality of frequencies are used, the applied sine wave combinations may contain discontinuities at the transition points between successive signals of different frequencies. Such discontinuities in the transmitted signal substantially extend the transmitted signal bandwidth although only closely related sine waves are employed. Avoidance of waveform discontinuities requires that the continuously running oscillators by synchronized and that switching between the two frequencies be done at preselected times at which smooth transitions can be accomplished.

The data transmission rate in the aforementioned systems can be increased by decreasing the signal periods. A desirable arrangement uses a half cycle of a fundamental sine wave frequency to represent one state of the digital signal and a full cycle of a phase locked second harmonic frequency to represent the other state. Signals are applied during successive half cycles of the fundamental sine wave to increase the signal transmission rate. Switching between the fundamental and second harmonic oscillators can be accomplished at the zero crossings of the fundamental sine wave. But, at these zero crossings, the sine wave signal to be applied to the line may be in phase or 180° out-of-phase with the sine wave being transmitted. If two adjacent signals are out-of-phase, an unwanted discontinuity results. The discontinuity can be avoided only if both phases of the sine wave signals are available and apparatus is provided to select the appropriate combination of phases which insures smooth transitions. In this case, the phase of the signal to be inserted is dependent on the selected phase of the preceding signal so that the phase selection equipment is usually complex and expensive.

BRIEF SUMMARY OF THE INVENTION

My invention is a data transmission system in which digital information is exchanged between transmission circuits interconnected by a relatively narrow bandwidth transmission path. The digital information is transmitted over the path in the form of sequential combinations of a fundamental frequency sine wave and a third harmonic frequency sine wave in equal signal periods extending between successive zero crossings of the fundamental frequency. The fundamental and third harmonic sine waves are synchronized with respect to frequency and phase at each zero crossing of the fundamental sine wave. The synchronized fundamental and third harmonic signals have identical phases at the fundamental sine wave zero crossings, and there is always a smooth transition between adjacent signal periods regardless of the difference in the frequencies of adjacent signals.

According to one aspect of my invention, digital information signals are applied to a modulation circuit which includes fundamental and third harmonic sine wave generators commonly synchronized at each zero crossing of the fundamental sine wave. Signals from the generators are selectively gated to a transmission path in signal periods extending between successive fundamental sine wave zero crossings in response to the digital signals.

According to another aspect of my invention, sequential combinations of sine waves from a transmission path are converted into digital information signals in a demodulation circuit which includes a pair of fundamental and third harmonic sine wave generators. The two generators are synchronized to each other at zero crossings of the fundamental sine wave and to the signal received from the transmission path. In the received signal synchronization a fundamental frequency synchronizing signal is derived from the received signal and is applied to the fundamental frequency generator. The outputs of the oscillators are linearly combined to form sampling pulses at the centers of the signal periods. These sampling pulses are combined with the received signals to detect the polarity of the received signals in the center portion of the signal periods whereby third harmonic signals are distinguished from fundamental signals.

According to another aspect of my invention, a data transmission system is formed by interconnecting the aforementioned modulation and demodulation circuits through a transmission path. Digital signals from a data source are applied to the modulation circuit and are converted therein into sequential combinations of fundamental and third harmonic sine wave signals which sine wave signals are coupled via said transmission path to said demodulation circuit. Digital signals corresponding to the transmitted sine wave signals are obtained from said demodulation circuit and are further coupled to a utilization device. In this way, a data link is established between a data source and a remotely located utilization device.

According to yet another aspect of my invention, the demodulator circuit further includes a gating device connected between the demodulator sine wave generators and a second transmission path. The gating device selectively passes signals from the generators to the second transmission path in response to digital signals. These digital signals may originate in a data source associated with the demodulator or may be derived from the signals received by the demodulator. In the latter case, the demodulator, including the gating device functions as a signal repeater.

According to still another aspect of my invention, a data loop is formed by a pair of remotely located transmission circuits interconnected via a pair of transmission paths. The first transmission circuit includes a store, a modulator circuit and a demodulator circuit. The store receives digital information from an associated utilization device and applies digital signals to the modulator. The modulator in turn selectively couples sequential sine wave combinations to the first transmission path. The demodulator receives sine wave signals from the second transmission path and couples digital signals corresponding to the received sine waves to the store in synchronism with the operation of the modulator.

The second transmission circuit includes a store and a demodulator having the aforementioned gating device. The demodulator receives sine wave signals from the first transmission path and couples corresponding digital signals to the associated store. Digital signals from the store are applied to the gating device which causes sequential sine wave combinations to be applied to the second transmission path. The operation of the second transmission circuit is synchronized to the first transmission circuit modulator so that digital information in the form of sequential combinations of harmonically related sine waves are simultaneously exchanged between the interconnected transmission circuits.

In an embodiment illustrative of the last mentioned aspect of my invention, a data transmission loop is formed by two transmission circuits interconnected by a pair of transmission lines. The first transmission circuit contains a multistage shift register that operates to exchange digital information in parallel fashion between the transmission circuit and an associated device. The last stage of the shift register is connected to a data transmitter so that synchronized outputs of a fundamental and a third harmonic signal oscillator contained therein are dated onto a voice band transmission line in response to digital information serially shifted through the shift register. The signal applied to the line consists of sequential combinations of half cycles of the fundamental sine wave and three half cycles of the third harmonic sine wave, each frequency being applied in successive signal periods extending between zero crossings of the fundamental sine wave.

A data receiver in the second transmission circuit receives signals from the first transmission circuit via one voice band transmission line. The receiver includes a separate pair of synchronized fundamental and third harmonic oscillators from which sampling pulses occurring at the center of each signal period of the received signal are derived by algebraically adding the two frequency sine waves. The sampling pulses are applied to detect the polarity of the received signal at each signal period center point thereby converting the received sine wave combinations into digital signals. The receiver operates in synchronism with the data transmitter of the first transmission circuit.

The data receiver in the second transmission circuit applies digital signals corresponding to the received sine wave signals to a first stage of a shift register connected thereto. The output of the last stage of the shift register controls a gate circuit to which the sine waves from the data receiver oscillators are applied. Sequential combinations of the sine waves are applied from the gate circuit to a second voice frequency transmission line. A data receiver in the first transmission circuit converts the sine wave signals received from the second transmission line into digital signals which are applied in serial fashion to the first stage of the associated shift register. In this way, digital information from the shift register of each transmission circuit is converted to sequential sine wave combinations and sent via a voiceband transmission line to the data receiver of the connected transmission circuit so that a data transmission loop is established.

The data receivers in this embodiment include circuitry which digitally derives a fundamental sine wave from the received signal by applying the aforementioned sampling pulses to the received signal to eliminate the center portion zero crossings of any received third harmonic signal. The derived signal synchronizes the data receiver oscillators to that of the data transmitter oscillators in the first transmission circuit.

Each oscillator pair in the transmission circuit is connected to a zero crossing synchronizing generator. The input of the synchronizing generator is coupled to the fundamental sine wave oscillator and the synchronizing generator output is applied at each fundamental sine wave zero crossing to momentarily interrupt both oscillators at each zero crossing. The oscillators are thereby synchronized to each other in each signal period. Each transmission circuit also includes control counters which are responsive to the received signals from the associated data receiver to control the number of shift operations of the shift register and data conversion.

DESCRIPTION OF THE DRAWING

FIG. 2 depicts an illustrative data transmitter of the embodiment of FIG. 1 in accordance with one aspect of my invention;

FIG. 4 depicts an illustrative data transceiver of the embodiment of FIG. 1 in accordance with another aspect of my invention;

FIG. 10 shows a single stage shift register which may be used with the circuit of FIG. 4 to form a data repeater illustrative of a further embodiment of my invention.

DETAILED DESCRIPTION

Figure 1:
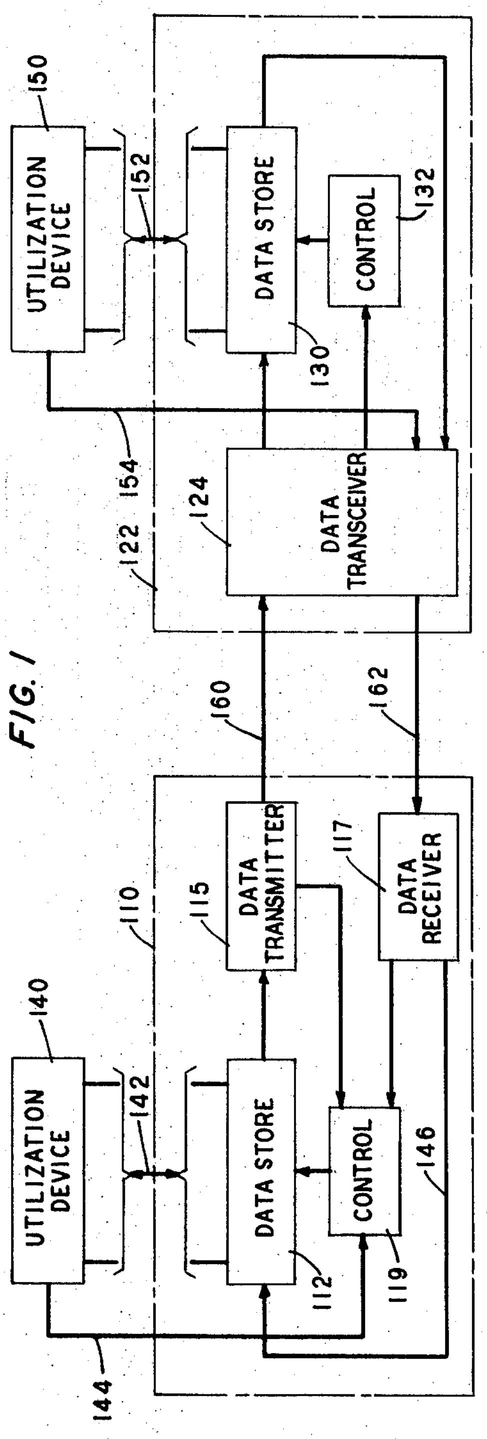
FIG. 1 depicts a data transmission loop illustrative of one specific embodiment of my invention.

A data transmission loop through which digital information is simultaneously exchanged between a pair of data transmission circuits is shown in FIG. 1. Transmission circuits 110 and 122 are connected via transmission lines 160 and 162. Transmission circuit 110 includes data store 112, data transmitter 115, data receiver 117 and control 119. Digital information from utilization device 140 is transmitted to store 112 via cable 142. The digital signals transmitted over cable 142 may all be inserted into data store 112 in parallel in one time interval or serially during several successive time intervals. A signal from device 140 over lead 144 activates control 119 which permits store 112 to transmit data pulses corresponding to the previously stored digital information to data transmitter 115 in serial fashion and activates both transmission circuits 110 and 122 so that data signals are exchanged therebetween. Data transmitter 115 converts the incoming digital signals into sequential combinations of fundamental and third harmonic sine waves in the manner hereinafter described and applies the sine wave signals to transmission line 160. In accordance with my invention, there are no discontinuities in the transitions between successively applied fundamental and third harmonic sine waves. Thus, the bandwidth of the transmitted sine wave sequence is substantially narrower than that of the corresponding data pulses and line 160 may be of the type used to transmit voice signals.

Sine wave signals received from line 162 are applied to data receiver 117 which converts the received sine waves into data signals. These data signals are applied via lead 146 to store 112 in synchronism with the application of data signals from store 112 to transmitter 115. In this manner, digital information stored in store 112 is transmitted to transmission circuit 122 and data signals corresponding to sine wave signals transmitted from transmission circuit 122 via line 162 are inserted in store 112. The data signals from receiver 117 which are stored in store 112 may be transferred to utilization device 140 via cable 142. After the transmitted data signals have been replaced by the received data signals, the circuit operation is complete.

Transmission circuit 122 is similar to circuit 110. It includes data store 130, control 132 and data transceiver 124. Store 130 operates to exchange digital signals between circuit 122 and utilization device 150 over cable 152. A signal may be applied from device 150 to transceiver 124 via lead 154 to initiate the operation of the data transmission loop including circuits 110 and 122. Sine wave signals from line 160 are converted into data signals by the receiver portion of a transceiver 124. In this way data signals are coupled to store 130. As hereinafter described, the data transceiver includes apparatus which synchronizes its operation to that of data transmitter 115. Data signals from store 130 originating in device 150 are converted in the transmitter portion of transceiver 124 into sequential sine wave combinations appropriate for transmission over line 162. Transceiver 124 and data receiver 117 both operate synchronously with transmitter 115. Therefore, signals from transmission circuit 110 are transmitted to circuit 122 over line 160, and signals from circuit 122 are simultaneously transmitted to circuit 110 over line 162. In this way, a pair of transmission lines form a relatively narrow bandwidth transmission path over which digital information is exchanged in the form of sequential combinations of synchronized fundamental and third harmonic sine waves.

Figure 9:
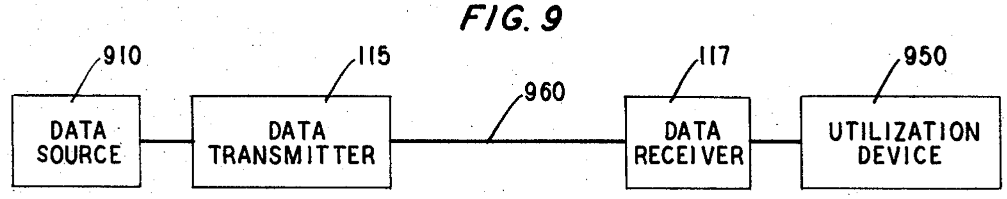
FIG. 9 depicts a one-way data transmission system illustrative of another embodiment of my invention.

It is to be understood that transmission arrangements other than a transmission loop may be built utilizing my invention. For example, a simple one-way data link may be constructed using sequential fundamental and third harmonic sine wave transmission to transmit digital information from a data source to a remotely located utilization device. This arrangement, as shown in FIG. 9, need only include a data transmitter 115, a data receiver 117 and an interconnecting transmission line 960. Digital signals applied from source 910 to transmitter 115 in serial fashion are converted to sine wave combinations which are transmitted to receiver 117. The digital signal output of receiver 117 is, in turn, coupled directly to utilization device 950.

Data transmitter 115 is shown in detail in FIG. 2. It includes fundamental sine wave generator or oscillator 210 and third harmonic sine wave generator or oscillator 212. These generators may be Hartley-type oscillators or may be other oscillators known in the art which can be mutually coupled to insure frequency tracking. In FIG. 2, mutual coupling is provided through lead 228 by a pair of resistances interconnecting similar amplifying device electrodes. It is to be understood other coupling arrangements known in the art may be used. The outputs of generators 210 and 212 are applied to buffer circuit 214 which operates to separately amplify the fundamental and third harmonic sine waves. The outputs of the buffer circuit are then coupled to tone gate 216. The fundamental sine wave is applied to AND gate 241 and the third harmonic sine wave is applied to AND gate 243 in tone gate circuit 216. Complementary data signals are transmitted to the tone gate via leads 218 and 219 from a digital device such as data store 112. In one state, the voltage on lead 218 is relatively high compared to the voltage on lead 219. Gate 241 is then opened and allows the fundamental sine wave to be applied via amplifier 244 to line 160. In the other state, the voltage applied to lead 219 is relatively high compared to the voltage on lead 218, and the third harmonic sine wave is applied through gate 243 and amplifier 244 to line 160.

Figure 3:
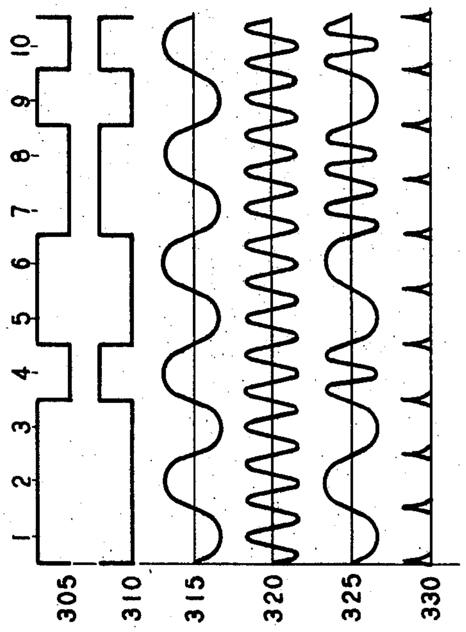
FIG. 3 shows waveforms illustrating the operation of the data transmitter of FIG. 2.

The operation of transmitter 115 is illustrated by the waveforms in FIG. 3. Waveform 315 is the fundamental frequency sine wave from generator 210 which appears on lead 230. Waveform 320 is the third harmonic frequency sine wave from generator 212 which appears on lead 232. These sine waves have identical phases at the beginning and the end of each signal period which periods extend between the zero crossings of the fundamental sine wave. Thus, there are three half cycles of the third harmonic sine wave and one half cycle of the fundamental sine wave in each signal period, and the slopes of sine waves at each fundamental frequency zero crossing are substantially the same. This is so because of the mutual coupling between generators 210 and 212 and the operation of synchronizer 222.

Synchronizer 222 includes zero cross detector 251, and pulse former 253. Detector 251 receives signals from generator 210 via lead 226. At each zero crossing of waveform 315, pulse former 253 provides the narrow pulses of waveform 330 in response to the operation of detector 251. These pulses are applied to both generators 210 and 212 via lead 224 to instantaneously interrupt the generators at each fundamental frequency zero crossing. This synchronizer arrangement adjusts the phase of the fundamental and third harmonic sine waves at each fundamental sine wave zero crossing. The generator interruption may be done by applying the narrow pulses from pulse former 253 to the control electrodes of the generator amplifying devices. It is, of course, necessary to obtain the synchronizing pulses from the fundamental generator. Otherwise, three phase relationships between fundamental and third harmonic signals in each signal period are possible.

Waveform 305 shows the signal appearing on lead 218 while waveform 310 shows the signal appearing on lead 219. Since each signal period extends between zero crossings of the fundamental sine wave of waveform 315, each individual data signal represented in waveforms 305 and 310 is applied to tone gate 216 for a half cycle of waveform 315. In the first signal period noted on FIG. 3, waveform 305 is high and waveform 310 is low. This condition causes gate 241 to pass a negative half cycle of the fundamental sine wave to line 160 via amplifier 244 as illustrated in waveform 325. During the second and third signal periods, there is no change in waveforms 305 and 310 so that two more successive half cycles of the fundamental sine wave appear in waveform 325. In the fourth signal period, the source of waveforms 305 and 310, which may be a flip-flop, reverses state and three half cycles of the third harmonic signal appear in waveform 325. The phases of the fundamental and third harmonic sine waves are identical at each fundamental frequency zero crossing. Thus, according to my invention, there is a smooth transition between the fundamental half cycle in the third signal period and the adjacent third harmonic sine wave in the fourth signal period. In like manner, the transition from the fourth signal period to the fifth signal period on waveform 325 is also smooth. Therefore, waveform 325 contains no discontinuities and the bandwidth of this signal is maintained within relatively narrow limits. It is to be understood that data transmitter 115 may be used independently, as a means of converting digital signals such as waveforms 305 and 310 into signal combinations of fundamental and third harmonic sine waves as illustrated in waveform 325, or in systems other than the data loop illustrated in FIG. 1.

Figure 5:
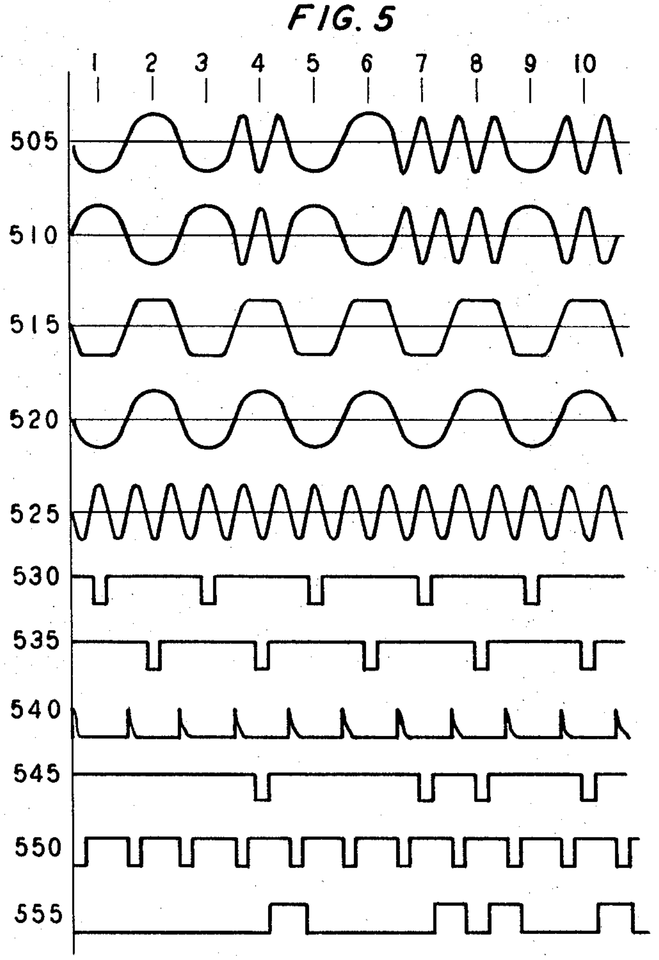
FIG. 5 shows waveforms illustrating the operation of the data transceiver circuit of FIG. 4.

FIG. 4 shows a data transceiver which may be utilized as receiver 117 or transceiver 124. Sequential combinations of sine waves from a transmission line are applied to line amplifier circuit 411 which amplifies the input signal and produces a pair of out-of-phase outputs on lines 475 and 476 in response thereto. The outputs are shown on waveforms 505 and 510 in FIG. 5. The signals from amplifier circuit 411 are sampled in sampling circuit 413. Sampling circuit 413 amplitude detects the applied sine wave signals and produces corresponding digital signals which may be further transmitted to a store such as store 130 in FIG. 1.

Transceiver 124 includes a pair of sine wave generators 410 and 412. These generators are identical to the sine wave generators 210 and 212 and are synchronized in frequency by mutual coupling via lead 428 and in phase by signals via lead 424. The phase synchronizing signals occur at each fundamental sine wave zero crossing in synchronizer 422. Zero cross detector 470 applies a pulse to pulseformer 471 at each zero crossing and the output of this pulseformer appears on lead 424. Output signals from synchronizer 422 are applied to both generators in response to fundamental sine waves from generator 410. This phase synchronization operates to correct any phase differences between generators 410 and 412 which may have taken place during the preceding signal period.

Buffer circuit 414 receives the fundamental and third harmonic sine wave signals from generators 410 and 412 and provides sampling signals to leads 431 and 433. The sampling signals are illustrated in waveforms 530 and 535 of FIG. 5. The sine wave outputs from generators 410 and 412, illustrated in waveforms 520 and 525, are linearly combined in buffer circuit 414 to form a signal $$S_1 = \sin 2\pi f_1 - \sin 2\pi f_2 \quad (1)$$

and are separately combined to form a signal $$S_2 = 2 \sin 2\pi f_1 + \sin 2\pi f_2. \quad (2)$$

The linear combination $S_1$ is amplified and rectified to produce pulses at the centers of alternate fundamental sine wave half cycles. The linear combination $S_2$ is similarly amplified and rectified to produce pulses at the centers of the remaining alternate fundamental sine wave half cycles. These linear signal combinations may be formed in weighted resistor networks or may be made by other techniques well known in the art.

The sampling pulses from buffer circuit 414 (waveforms 530 and 535) are coupled via leads 431 and 433 to sampling circuit 413 wherein the signal received from circuit 411 is sampled. Amplifier 452 in circuit 411 provides the output illustrated in waveform 505 on line 475 and the output illustrated in waveform 510 on line 476. Waveform 505 is applied to detector gate 451 and is compared therein to sampling pulse waveform 530 from lead 431. Where waveform 505 from amplifier 452 is positive at the time the sampling pulse is present, an output signal is transmitted from gate 451 to set flip-flop 415 to the one state. This occurs only if a third harmonic signal appears on lead 475. Thus, during signal periods 1, 3, 5 and 9, there is no output from gate 451. But, the center half cycle of the third harmonic signal of waveform 505 in signal period 7 is positive. Therefore, an output is transmitted from gate 451 via gate 454 to the set input of flip-flop 415. This output pulse, during signal period 7, is shown in waveform 545. Gate 453 operates in similar fashion on waveform 510 in signal periods 2, 4, 6, 8 and 10; and an output pulse from gate 454 occurs in response to the positive portion of the third harmonic signals in signal periods 4, 8 and 10.

Flip-flop 415 is reset to the zero state by a signal from pulseformer 473 in synchronizer 422. As previously described, synchronizer 422 receives fundamental sine wave signals from generator 410 and provides a pulse on line 424 to commonly synchronize generators 410 and 412. This pulse is shown in waveform 540. In the data receiver, pulseformer 473 operates in response to a signal from pulseformer 471 to reset flip-flop 415 at the end of each signal period. The pulses from pulseformer 473 are shown in waveform 550. During signal period 4, for example, a third harmonic sine wave is sampled and flip-flop 415 is set to the one state by the pulse shown in waveform 545. At the end of this signal period, a pulse from pulseformer 473 resets flip-flop 415 to the zero state. The one output of flip-flop 415 is shown on waveform 555. Pulses are obtained from the one output of flip-flop 415 in every signal period in which there is a third harmonic sine wave.

In order to properly detect the signal incoming to line amplifier 411, it is necessary to synchronize generators 410 and 412 to the received sine wave signals. Unless this is done, the sampling pulses on leads 431 and 433 may be applied at times other than the center of each signal period and the resulting output of flip-flop 415 would bear no relationship to the digital information contained in the received waveforms. The synchronization to the received signal is accomplished by transmitting a fundamental signal derived from the output of amplifier 452 to fundamental sine wave generator 410 via lead 461. Since either a fundamental or a third harmonic signal may appear at the output of amplifier 452, it is necessary to convert the received third harmonic signals into fundamental sine wave signals. This is done in shaper gate 455 which receives sampling pulses from leads 463 and 465. In response to these sampling pulses, gate 455 is effective to block out the center half cycle of each third harmonic signal applied thereto. Thus, the output of gate 455 is the fundamental frequency signal shown in waveform 515. Waveform 515 is coupled to generator 410 via lead 461 to synchronize it to the received signals. The output of generator 410, synchronized to the received signal, is appropriately applied to synchronizer 422 as described with respect to transmitter 115 so that both generators 410 and 412 are in phase with the received signals.

Data transceiver 124 operates as a data receiver and also operates to convert data signals appearing on leads 418 and 419 into sine wave signal combinations. This is accomplished by adding tone gate 416 to the just described data receiver. Fundamental and third harmonic sine waves are separately applied to AND gates 441 and 443 in tone gate 416. Data signals from a separate store, such as store 130, are also applied to gates 441 and 443 via leads 418 and 419. As described with respect to FIG. 2, the output signal from amplifier 444 is a sequential combination of fundamental and third harmonic signals which signals are transmitted over a relatively narrow transmission line to a separately located transmission circuit. The sine wave signals from tone gate 416 are derived from generators 410 and 412 which, in turn, are synchronized to the generators of data transmitter 115.

Tone gate 416 is not required in a data receiver such as receiver 117 of FIG. 1. In data transceiver 124, however, tone gate 416 produces sine wave combinations which are fully synchronized to the operation of transmitter 115. In this way, a separate pair of generators and synchronizing apparatus for transmission over line 162 is avoided. Generators 210 and 212 of FIG. 2 are the master oscillators of the data transmission system illustrated in FIG. 1. The generator pairs in transceiver 124 and receiver 117 are synchronized to the signals applied thereto which signals are in turn synchronized to generators 210 and 212. Therefore, the fundamental and third harmonic sine wave combinations may be simultaneously exchanged between transmission circuits in a synchronized manner.

The data transceiver of FIG. 4 may also be used as a signal repeater in transmission lines which substantially attenuate the applied sine wave signals. This is readily accomplished by applying the output of flip-flop 415 to a single stage shift register and utilizing the digital signals therefrom to control tone gate 416. Shift register stage 1010 of FIG. 10 provides a single bit store for the digital signal transmitted from flip-flop 415 via leads 482 and 484 to leads 1012 and 1014 of register 1010. The outputs of flip-flop 1010 are connected to leads 418 and 419 via leads 1020 and 1022 so that the digital information corresponding to the attenuated received sine wave signals appearing on line 480 causes standard amplitude and resynchronized sine wave signals to be applied to line 478. It is to be understood that a plurality of repeaters each including transceiver 124 and shift register 1010 may be connected to voice band transmission lines in data links or data transmission loops utilizing the principles of my invention.

Figure 6:
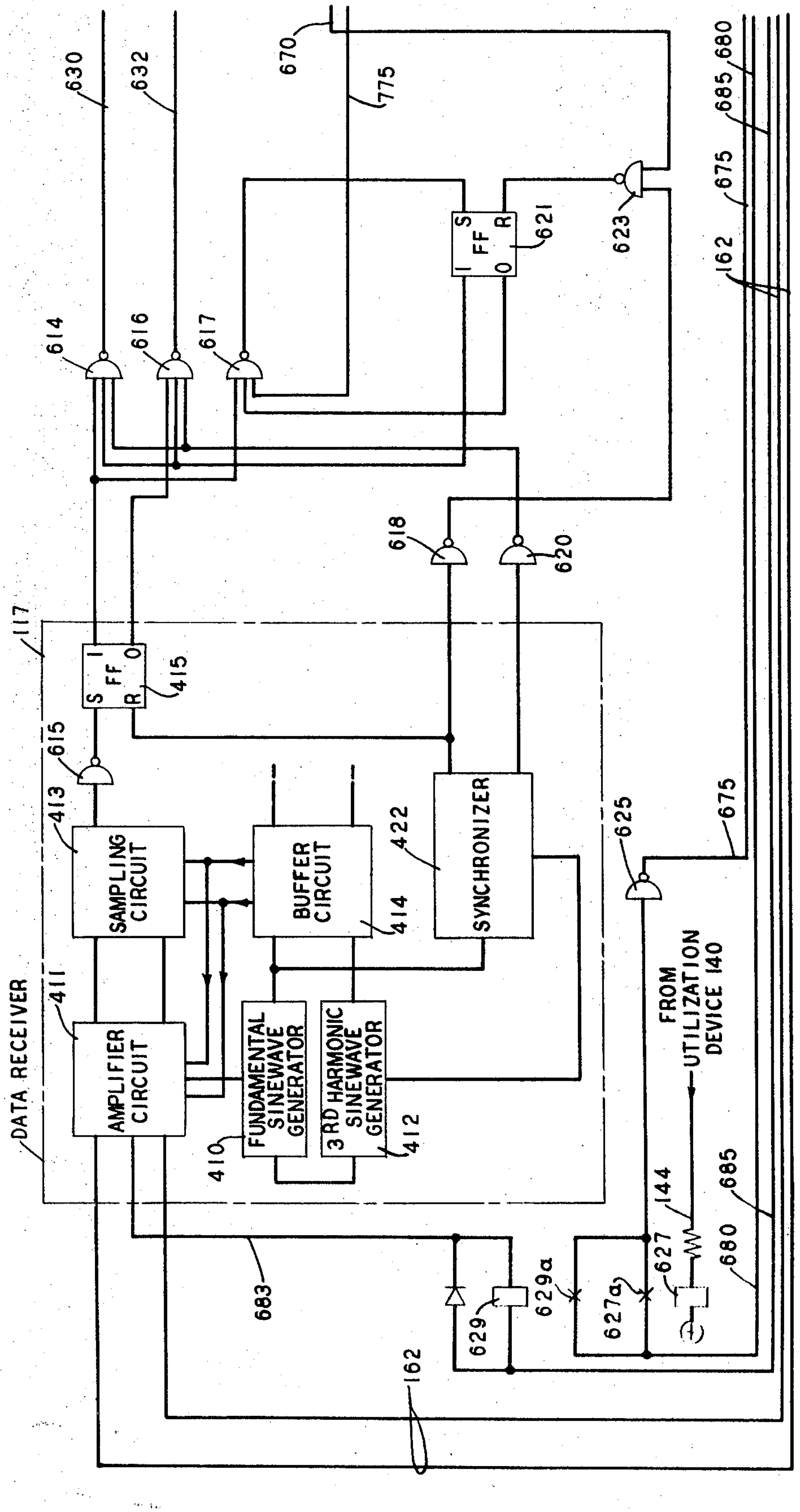
FIGS. 6 and 7, when placed side-by-side, show one illustrative transmission circuit used in the data transmission loop of the embodiment of FIG. 1 in accordance with my invention wherein a separate data transmitter and a separate data receiver are used.
Figure 7:
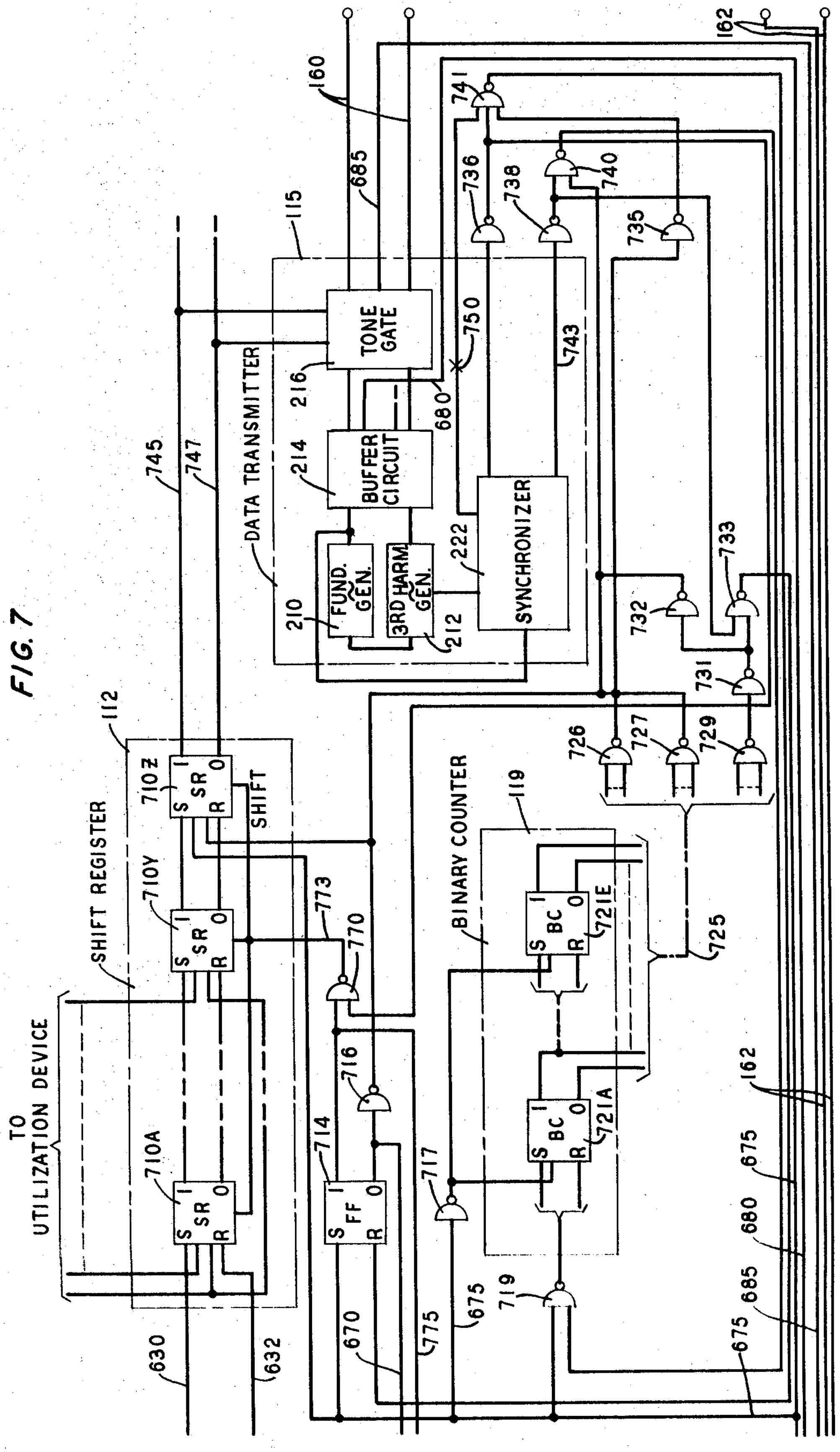
Figure 8:
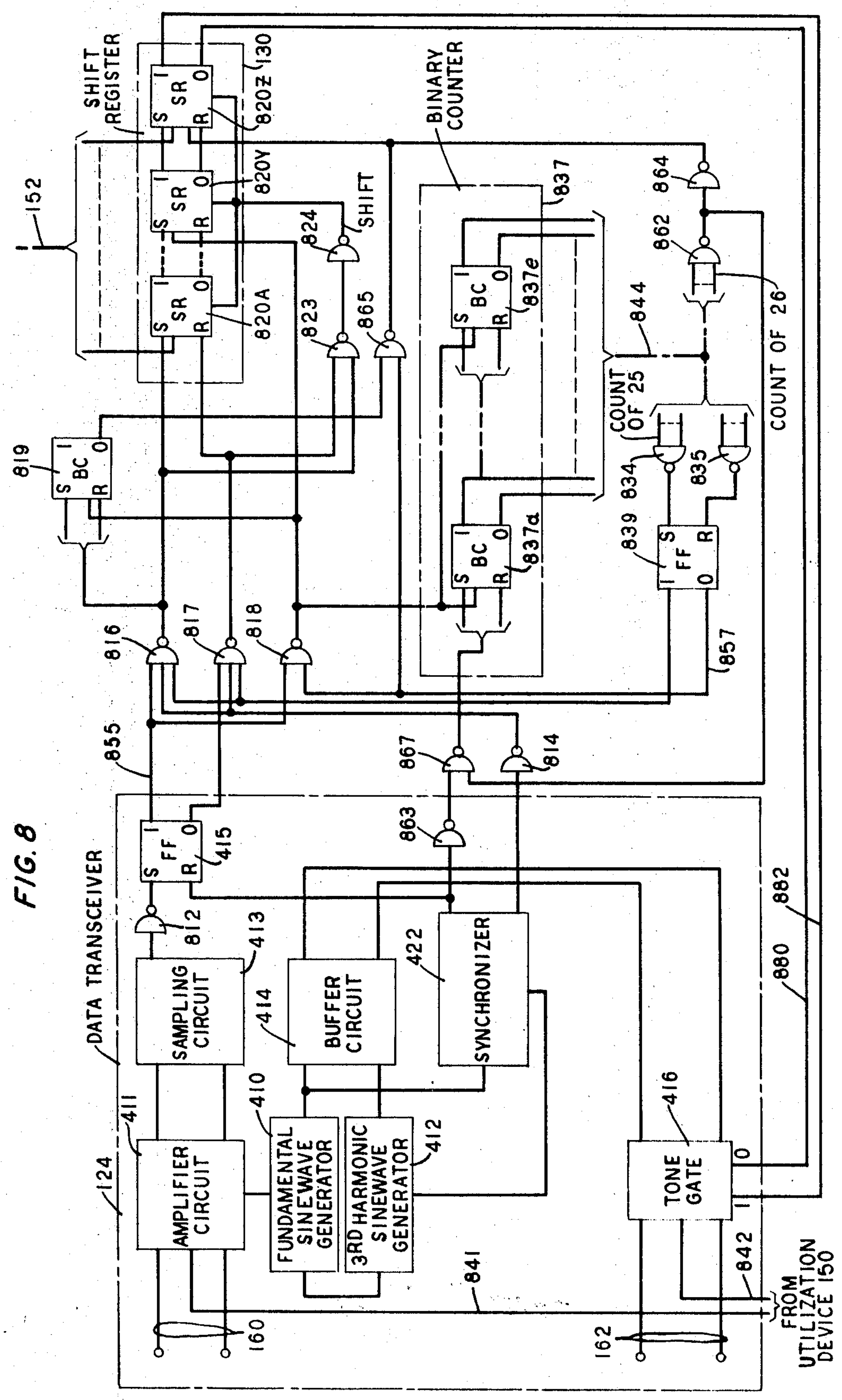
FIG. 8 shows another illustrative data transmitter circuit of the data transmission loop of the embodiment of FIG. 1 in accordance with my invention wherein a data transceiver is used.

The data transmission loop of FIG. 1 is shown in detail in FIGS. 6, 7 and 8. FIGS. 6 and 7 together show a transmission circuit corresponding to circuit 110 of FIG. 1 including a data transmitter 115, data receiver 117, shift register 112 for data storage, and a counter 119 for controlling the circuit operation. Transmitter 115 is connected via transmission line 160 to the data transceiver 124 of the remotely located transmission circuit of FIG. 8 corresponding to circuit 122 of FIG. 1.

Referring to FIGS. 6 and 7, shift register 112 includes 26 stages which stages store and operate on 26 bits of digital information. The output of stage 710Z of shift register 112 is connected to tone gate 216 of data transmitter 115. When the transmission loop is idle, i.e., no digital information is being transferred, shift register stage 710Z is reset to the zero state and a fundamental sine wave signal is applied to line 160 from tone gate 216.

The fundamental signal in the illustrative embodiment is used as a space signal and the third harmonic signal is used as a mark signal. The first or initial mark signal transmitted from the transmission circuit of FIGS. 6 and 7 is operative, as hereinafter described, to activate the remotely located transmission circuit. The initial mark signal is generated as follows. A signal from utilization device 140 via lead 144 operates relay 627 of FIG. 6. This permits the next occurring sampling signal from buffer circuit 214, on FIG. 7, to be applied to gate 625 via lead 680 and contact 627*a* of relay 627. The sampling signal from buffer 214 on lead 680 always occurs during the negative half cycles of the fundamental sine wave signal and causes a positive pulse to appear on lead 675 which pulse is inverted in gate 717 and coupled to set each of the five stages of counter 119 to the one state. Counter 119 is set to a count of 31 at this time. The outputs of counter 119 are transmitted via cable 725 to gates 726, 727 and 729. When all of counter stages 721A through 721E are in the one state, gate 729 is activated. The output of gate 729 is inverted in gate 731 and an enabling signal therefrom is applied to gate 733. At the next zero crossing of the fundamental sine wave signal from generator 210, an output pulse from synchronizer 222 appears on lead 743. This synchronizer output pulse is inverted in gate 738 and is applied to enable gate 733. At this zero crossing, gate 733 opens and a signal is applied therefrom via gate 719 to counter stage 721A to add one to counter 119. Each stage of counter 119 is now placed in its zero state. The signal from gate 733 is also applied to set flip-flop 710Z. Setting flip-flop 710Z to the one state causes a third harmonic or initial mark signal to pass through tone gate 216 to line 160.

The pulse from gate 733 sets flip-flop 714 to the one state and thereby provides an enabling signal on lead 670. The setting of flip-flop 714 also activates gate 716 which, in turn, transmits a signal to gate 740. Gate 740 also receives a signal at each zero crossing of the fundamental sine wave from gate 738. These pulses open gate 740 and a pulse therefrom is transmitted to augment bit counter 119 via gate 719. Gate 770 is enabled at each zero crossing by pulses from synchronizer 222 via gate 736 when flip-flop 714 is set. The outputs from gate 770 are transmitted to all stages of shift register 112 to shift the digital information stored therein one place to the right. In this way, the digital information stored in shift register 112 is shifted right one position at each zero crossing and is successively applied to gate 216 via register stage 710Z to cause a sequence of fundamental and third harmonic sine waves to be applied to line 160. The sine waves applied in each signal period between zero crossings of the fundamental sine wave correspond to the shifted information from shift register 112. Thus, when shift register stage 710Z is in the one state, a third harmonic or mark signal is applied to line 160 and when stage 710Z is in the zero state, a fundamental or space signal is applied to line 160.

The initial mark signal from the transmission circuit of FIG. 8 generated in response to the initial mark signal applied to line 160 is detected to set flip-flop 415 in receiver 117 on FIG. 6. The one output of flip-flop 415 passes through gate 617 which is enabled by signals from previously set flip-flop 714 and previously reset flip-flop 621. The one output of flip-flop 714 is connected to gate 617 via lead 775. The detected mark signal sets flip-flop 621. Synchronizer 422 on FIG. 6 provides an output signal at each fundamental sine wave zero crossing which passes through gate 620 to sample the output of flip-flop 415. Subsequent to the initial setup of the transmission loop, gates 614 and 616 are enabled by flip-flop 621 to appropriately pass detected mark and space signals from flip-flop 415 in response to sine wave signals on line 162. The outputs of gates 614 and 616 are applied via leads 630 and 632 to shift register stage 710A so that digital information responsive to the received sine wave signals is successively inserted in shift register 112 to replace the digital information transmitted to tone gate 216.

After counter 119 has been augmented 26 times, signals therefrom via cable 725 alert gate 726 on FIG. 7. This gate now causes a signal to be applied to gate 741 through inverter 735. A signal from synchronizer 222 on FIG. 7 is also applied to gate 741 at this time via gate 736. These two signals activate gate 741 which operates to reset flip-flop 714. The zero output of flip-flop 714 then inhibits gate 740 so that no further pulses are applied to augment counter 119. Gate 770 is also inhibited so that shift pulses are no longer applied to register 112. The signal on lead 670 from flip-flop 714 is applied to gate 623 on FIG. 6 together with an output from gate 618 of synchronizer 422. This arrangement resets flip-flop 621 at the end of the 26th shift operation. After flip-flop 621 is reset, gates 614 and 616 are inhibited and no further signals are applied therefrom to shift register 112. At this time, the information transfer is complete. The digital information originally stored in shift register 112 has been transmitted to the remotely located transmission circuit of FIG. 8 and digital information originating in the remotely located transmission circuit of FIG. 8 has been placed in shift register 112.

The transmission delay through lines 160 and 162 varies in accordance with the lengths of these lines so that the delay may be more than one signal period. In this event, it is necessary to allow one more information bit to be transferred between the transmission circuits. An input to gate 741 is connected to synchronizer 222 on FIG. 7 through switch 750. Switch 750 is closed when it is known that an extra signal period is required. The closing of switch 750 causes a signal from synchronizer 222 to be applied to gate 741 to inhibit its operation until the 27th shift operation. The output from gate 727 is sent to gate 741 when counter 119 attains the 27th count. At this time, gate 741 is activated to reset flip-flop 714 to terminate the operation of the transmission circuit.

The sequence of fundamental and third harmonic sine waves from data transmitter 115 on FIG. 7 is transmitted to the remotely located transmission circuit shown on FIG. 8. This transmission circuit includes data transceiver 124, shift register 130 and control counter 837. When no transmission is taking place between the circuit of FIGS. 6 and 7 and the circuit of FIG. 8, an idling signal consisting of successive fundamental sine waves is received by line amplifier 411 on FIG. 8.

Counter 837 has passed through the count of 25 during a previous transmission. Gate 835 is now open and flip-flop 839 is reset so that the one output from flip-flop 839 inhibits gates 816 and 817. The receipt of the aforementioned initial mark signal from transmitter 115 causes flip-flop 415, on FIG. 8, to be set to the one state. The output from flip-flop 415 of FIG. 8 on lead 855 is applied to gates 816 and 818. This insures that no signals can be applied to shift register 130 from gates 8!6 and 817. The output on lead 857 from flip-flop 839 at this time, however, enables gate 818 so that the initial mark signal causes an output to appear thereon. This output sets all stages of counter 837 to the one state and sets stage 820Y to the one state. Gate 834 is enabled when all stages of counter 837 are set to the one state since its inputs are connected to the one side of all the counter stages via cable 844. The output from gate 834 sets flip-flop 839 which, in turn, provides signals to enable gates 816 and 817 and to inhibit gate 818. Flip-flop 415 is still set in response to the initial mark signal. The first time a signal appears at the output of gate 814 due to a zero crossing, an output signal from gate 816 passes through gate 823 to augment counter 837 to the zero count. The output of gate 824 operates to shift all stages of register 130 one place to the right. This shift operation transfers the one bit from stage 820Y into stage 820Z and a one output from stage 820Z causes a third harmonic signal to be applied to line 162 from tone gate 416. The third harmonic signal is sent to receiver 117 on FIG. 6, and this signal is the initial mark which allows the receiver circuit of FIG. 6 to start operation as previously described.

A signal from utilization device 150 via leads 841 and 842 may be applied to lines 160 and 162 in a phantom circuit arrangement well known in the art to turn on relay 629 in FIG. 6. This is done via lead 685 connected to tone gate 216 of FIG. 7 and lead 683 connected to line amplifier 411 of FIG. 6. The turn-on of relay 629 closes contact 629*a* so that the next occurring sampling signal from buffer circuit 214 starts the operation of the transmission circuit of FIGS. 6 and 7 which, in turn, activates the transmission loop in the manner previously described. In this way, a signal from the transmission circuit of FIG. 8 may be used to activate the transmission loop.

After the initial mark signal is applied to transceiver 124 on FIG. 8, the succeeding fundamental and third harmonic sine waves cause flip-flop 415 on FIG. 8 to provide signals which pass through gates 816 or 817 each time a signal is present on gate 814. Gate 814 is activated each time synchronizer 422 of FIG. 8 detects a zero crossing. Mark signals activate gate 816 which, in turn, sets stage 820A. All signals from gates 816 and 817 pass through gate 823 and gate 824 to shift the digital information in register 130 one place to the right. Counter 837 is augmented by a signal from synchronizer 422 via gate 863 and gate 867. When the transmission loop is idle, counter 837 is set to 26. In the 26-state, gate 862 is enabled to inhibit gate 867 so that pulses from synchronizer 422 do not affect counter 837. The shifting operation which is initiated by a signal from gate 814 allows digital information from line 160 to be placed in register 130 in serial fashion and causes tone gate 416 of transceiver 124 of FIG. 8 to put sequential sine wave combinations on line 162 in accordance with the digital information shifted out of stage 82OZ. The information from the one and zero outputs of stage 82OZ is applied to tone gate 416 of FIG. 8 via leads 880 and 882. In this way, the transmission circuit of FIG. 8 operates to receive information from line 160 and to transfer information from register 130 to line 162.

At the end of the 26th transfer into shift register 130, counter 837 has reached a count of 25. Signals corresponding to this count are applied to open gate 835 via cable 844 and the output signal from just enabled gate 835 resets flip-flop 839. Gates 816 and 817 are inhibited after flip-flop 839 is reset and gate 818 is enabled to pass the initial mark of a subsequent transmission.

In order to detect any erroneous signal transmission to the circuit of FIG. 8, a parity check arrangement utilizing flip-flop 819 is provided. The initial mark pulse from gate 818 resets flip-flop 819 which operates as a single stage binary counter to count all the mark signals present in the transmission. Thus, at the end of the transmission, it is possible to determine whether an even or an odd number of mark signals had been received by the circuit of FIG. 8, If there are a predetermined number of mark signals, the parity check is completed successfully. The output of counter 819 may then be transmitted back to the transmission circuit of FIG. 6 and 7 to indicate successful transmission.

Transmission has ended when counter 837 has reached the state of 25 and flip-flop 839 has been reset. At this time, the initial mark has been shifted into stage 82OZ. If, at this time, flip-flop 819 is set, the initial mark in stage 82OZ is permitted to remain there for one signal period and a mark signal is transmitted via tone gate 416 to transmission line 162. Stage 82OZ is reset by gate 864 when gate 862 receives signals corresponding to the count of 26 from counter 837. Gate 862 further prevents counter 837 from being augmented since the output from gate 862 inhibits gate 867 which receives counting pulses from gate 863. If flip-flop 819 is reset when counter 837 has reached a count of 25, stage 82OZ is reset through gate 865. This occurs when counter 839 is reset. A space signal is then transmitted during the following signal period to line 162. It is to be understood that the parity count obtained in the transmission circuit of FIGS. 6 and 7 and in FIG. 8 can be compared using other techniques well known in the art.

While my invention has been described with reference to particular embodiments, it is to be understood that the arrangements disclosed are merely illustrative of the principles of my invention. Numerous modifications may be made and other arrangements devised without departing from the spirit and scope of my invention. For example, the third harmonic signal amplitude may be made three times larger than the fundamental frequency amplitude to avoid DC components in the transmitted sine wave signal combinations and to compensate for the greater transmission attenuation of the higher frequency signals. The just mentioned difference in amplitude insures that the time integral of the sine waves over any two adjacent signal periods is zero so that DC components of transmitted signals are eliminated. Since the fundamental and third harmonic signals are generated separately, an amplitude adjustment is easily accomplished.

What I claim is:

1. A signal transmission system comprising a signal source, a transmission path, modulating means responsive to digital signals successively applied from said signal source for generating sequential combinations of fundamental and third harmonic sine waves in signal bit periods extending between immediately successive pairs of zero crossings of the fundamental sine wave, and means for applying said sequential fundamental and third harmonic sine wave combinations to said transmission path, said modulating means comprising means for generating a fundamental sine wave signal and a third harmonic sine wave signal, means for synchronizing fundamental and third harmonic sine wave signals to have identical phases at each zero crossing of said fundamental sine wave, means connected between said generating means and said transmission path applying means responsive to said successively applied digital signals for selectively gating one of said generated sine waves to said transmission path applying means in each bit period, demodulating means connected to said transmission path for converting sequential fundamental and third harmonic sine wave combinations received from said transmission path to digital signals having the same form as the digital signals from said signal source, said demodulating means comprising second means for generating a fundamental sine wave and a third harmonic sine wave in signal bit periods extending between immediately successive pairs of zero crossings of said fundamental sine wave, second means for synchronizing said sine waves to have identical phases at each of said zero crossings, means for generating sampling signals at the midpoints of said signal bit periods comprising means for algebraically combining said generated fundamental and third harmonic sine waves, and means jointly responsive to sine waves signals received from said transmission path and said sampling signals for detecting the polarity of said sine wave signals from said transmission path at said signal period midpoints.

2. A signal transmission system according to claim 1 wherein said modulator and demodulator sine wave generating means are operative to produce the same frequency fundamental and third harmonic sine waves, and said demodulating means further comprises means for deriving a fundamental frequency sine wave signal from said received signals in each signal bit period, and for applying said derived fundamental sine wave signal to said demodulator generating means to synchronize said demodulator generating means to said received signals.

3. In a data transmission system for exchanging digital information between devices in the form of sequential combinations of fundamental and third harmonic sine wave signals having bit periods extending between immediately successive pairs of the zero crossings of said fundamental sine wave via a transmission path, a repeater circuit comprising means for receiving sequential combinations of said fundamental and third harmonic sine waves from said transmission path, each of said bit periods containing one of said sine wave signals to form said sequential combinations, means for converting each sine wave received in a bit period into a corresponding digital signal having the same bit period, means for generating fundamental and third harmonic sine waves having identical phases at each of the fundamental sine wave zero crossings, means responsive to each digital signal from said converting means for gating one of said generated fundamental and third harmonic sine waves to said transmission path in each bit period whereby a sequential combination of fundamental and third harmonic sine waves corresponding to said received sine wave combination is applied to said transmission path.

4. In a data transmission system for exchanging digital information between devices in the form of sequential combinations of fundamental and third harmonic sine wave signals via a transmission path, a repeater circuit according to claim 3 wherein said converting means comprises means for combining said generated sine waves to form sampling pulses at each bit period midpoint and means jointly responsive to said received sine waves and said sampling pulses for determining the polarity of said received signals at said midpoints, and further comprising means connected between said converting means and said gating means for storing said digital signals.

5. A data transmission system for exchanging digital information between a pair of devices in the form of sequential combinations of fundamental and third harmonic sine wave signals having a signal bit period extending between immediately successive zero crossings of said fundamental frequency sine wave comprising a transmission path and a transmission circuit associated with each device, and means for coupling digital signals having bit periods extending between immediately successive zero crossings of said fundamental sine wave signal between one of said pair of devices and the associated transmission circuit, said transmission circuit comprising modulating means connected between said coupling means and said transmission path for converting said digital signals into said sequential combinations of fundamental and third harmonic sine wave signals and for applying said fundamental and third harmonic sine wave signals to said transmission path, each of said bit periods containing one of said sine wave signals to form said sequential combinations, said modulating means comprising first means for generating a fundamental and a third harmonic sine wave having identical phases at the zero crossings of said fundamental sine wave, and means connected between said first generating means and said transmission path responsive to said digital signals from said coupling means for selectively gating one of said generated sine waves to said transmission path in each signal bit period, and demodulating means connected between said transmission path and said coupling means for converting fundamental and third harmonic sine wave signals of said signal bit period received from said transmission path into digital signals of said bit period and for applying the digital signals corresponding to said received sine wave signals to said coupling means, said demodulating means comprising second means for generating a fundamental sine wave and a third harmonic sine wave having identical phases at the zero crossings of said fundamental sine wave, means for forming sampling signals at said signal bit period midpoints comprising means for linearly combining said generated sine waves from said second generating means, means jointly responsive to said sampling signals and said received sine waves for detecting the polarity of said received signals at said signal bit period midpoints, and means for producing one of first and second types of digital signals corresponding to the detected polarity of each received signal.

6. A data transmission system according to claim 5 wherein said coupling means comprises means for storing the digital signals from said associated device and said demodulating means.

7. A data transmission system according to claim 6 wherein said first generating means comprises means for synchronizing said fundamental and third harmonic sine wave generating means at each of the fundamental sine wave zero crossing, said digital signals comprise two alternative signal types, and said gating means comprises means responsive to one signal type for applying a half cycle of said fundamental sine wave to said transmission path, and means responsive to the other signal type for applying three consecutive half cycles of said third harmonic sine wave to said transmission path whereby a smooth transition always occurs between the sine wave signals of consecutive signal periods.

8. A data transmission system according to claim 7 wherein said synchronizing means comprises means responsive to said fundamental sine wave signals for momentarily interrupting said fundamental and third harmonic generating means at each fundamental sine wave zero crossing to maintain identical phases between said fundamental and third harmonic generating means at said zero crossings.

9. A data transmission system according to claim 8 wherein said second generating means comprises a fundamental sine wave oscillator and a third harmonic sine wave oscillator, and means responsive to said fundamental sine wave oscillator signals for synchronizing the frequency and phase of said demodulating means sine wave oscillators at each the zero crossings of fundamental sine wave.

10. A data transmission system according to claim 9 wherein said demodulating means further comprises means responsive to said received signals for deriving a fundamental sine wave signal from said received signal in each signal bit period, and means for coupling said derived signal to said fundamental sine wave oscillator whereby said fundamental and third harmonic oscillators are synchronized to said received signal.

11. A data transmission system according to claim 10 wherein said deriving means comprises means for blocking the center half cycle of each received third harmonic sine wave signal.

12. A data transmission loop for simultaneously exchanging data information between two devices in the form of sequential combinations of fundamental and third harmonic sine wave signals having signal bit periods extending between immediately successive zero crossings of said fundamental frequency comprising a pair of transmission lines and a data link circuit having data storage means, said data link circuit further comprising a data transmitter connected between said storage means and one of said transmission lines for converting data signals having bit periods extending between immediately successive zero crossings of said fundamental sine wave from said storage means to sequential combinations of fundamental and third harmonic sine wave signals having one of said sine wave signals in each of said bit periods and identical phases at each zero crossing of said fundamental sine wave, said data transmitter comprising first means for generating a fundamental and a third harmonic sine wave having identical phases at the zero crossings of said fundamental sine wave, and means connected between said first generating means and the one of said pair of transmission lines responsive to said data signals for selectively gating one of said generated sine waves to the one of said pair of transmission lines in each signal bit period, and a data receiver connected between the other of said transmission lines and said storage means for converting the sequential sine wave combinations received from said other transmission line having said bit periods into data signals having said bit periods and for applying said data signals to said storage means, said data receiver comprising second means for generating a fundamental and a third harmonic sine wave having identical phases at the zero crossings of said fundamental sine wave, means for combining sald fundamental and third harmonic sine wave from said second generating means to form sampling signals at the midpoints of said signal bit periods and means jointly responsive to the sampling signals and the received sine wave combinations for detecting the polarity of said received sine wave combinations at said signal bit period midpoints.

13. A data transmission loop according to claim 12 further comprising a second data link circuit including data transceiver comprising means for converting the sequential sine wave combinations received from said one transmission line having said bit periods into first data signals, means for applying sald first data signals to a store in said second data link circuit, means for coupling second data signals from a device associated with said second data link circuit to said store, means for converting said stored second data signals into fundamental and third harmonic sequential sine wave signal combinations, each sine wave signal corresponding to a second data signal having a bit period extending between immediately successive zero crossings of said fundamental sine wave, and means for applying the sequential sine wave combinations corresponding to said second data signals to said other transmission line.

14. A data transmission loop according to claim 13 wherein said data transmitter, said data receiver, and sald data transceiver each includes an associated pair of fundamental and third harmonic sine wave oscillators and means for synchronizing each oscillator pair at the zero crossings of said fundamental sine wave.

15. A data transmission loop according to claim 14 wherein said means for converting said data signals into said sine wave combinations comprises means responsive to said data signals for selectively gating the outputs of said sine wave oscillators in said bit periods.

16. A data transmission loop according to claim 15 wherein said data receiver and said data transceiver each further comprises means for deriving a fundamental sine wave from said successively received sine wave combinations in each signal period and means for applying said derived sine wave to the associated oscillator pair to synchronize said associated oscillator pair to the data transmitter oscillator pair whereby the operation of said data receiver and said data transceiver is synchronized to the operation of said data transmitter.